Sept. 24, 1968  G. W. PALMER ETAL  3,402,837
REFUSE COLLECTING VEHICLE
Filed Sept. 12, 1966  3 Sheets-Sheet 2
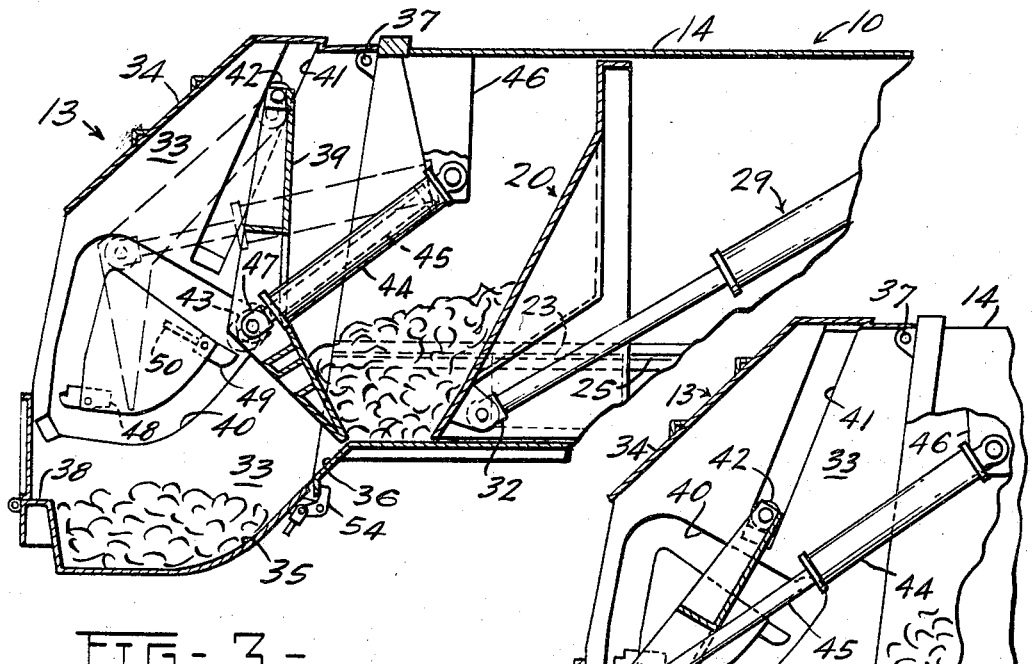
FIG-3-
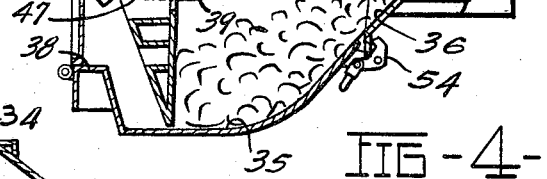
FIG-4-
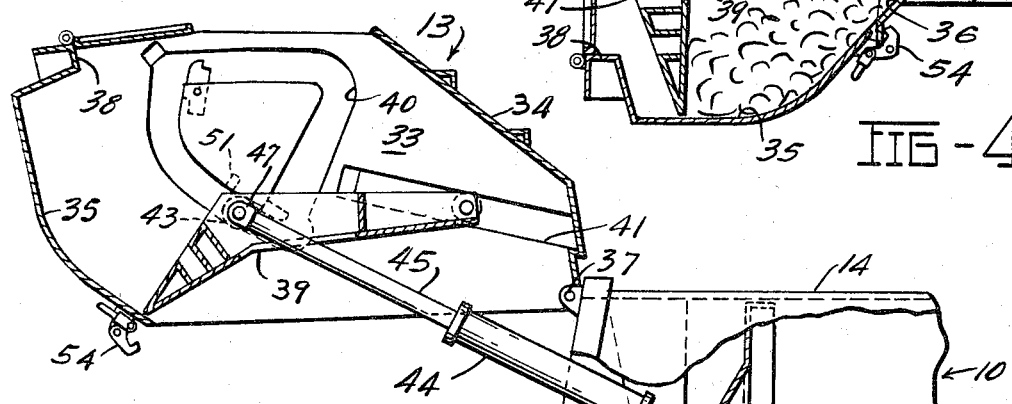
FIG-5-
INVENTORS:
GEORGE W. PALMER,
RICHARD C. GAST,
RAY E. BARTHOLOMEW.
BY Owen & Owen
ATT'YS.

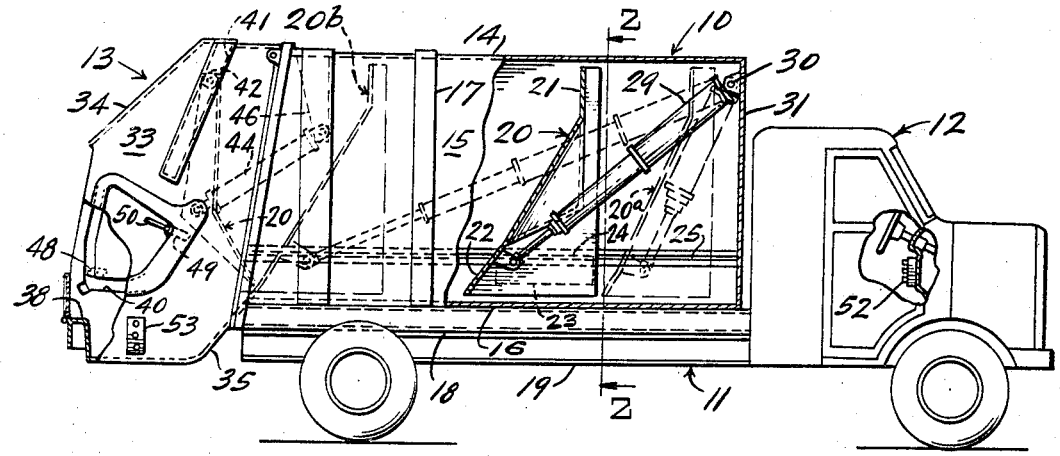
FIG-1-
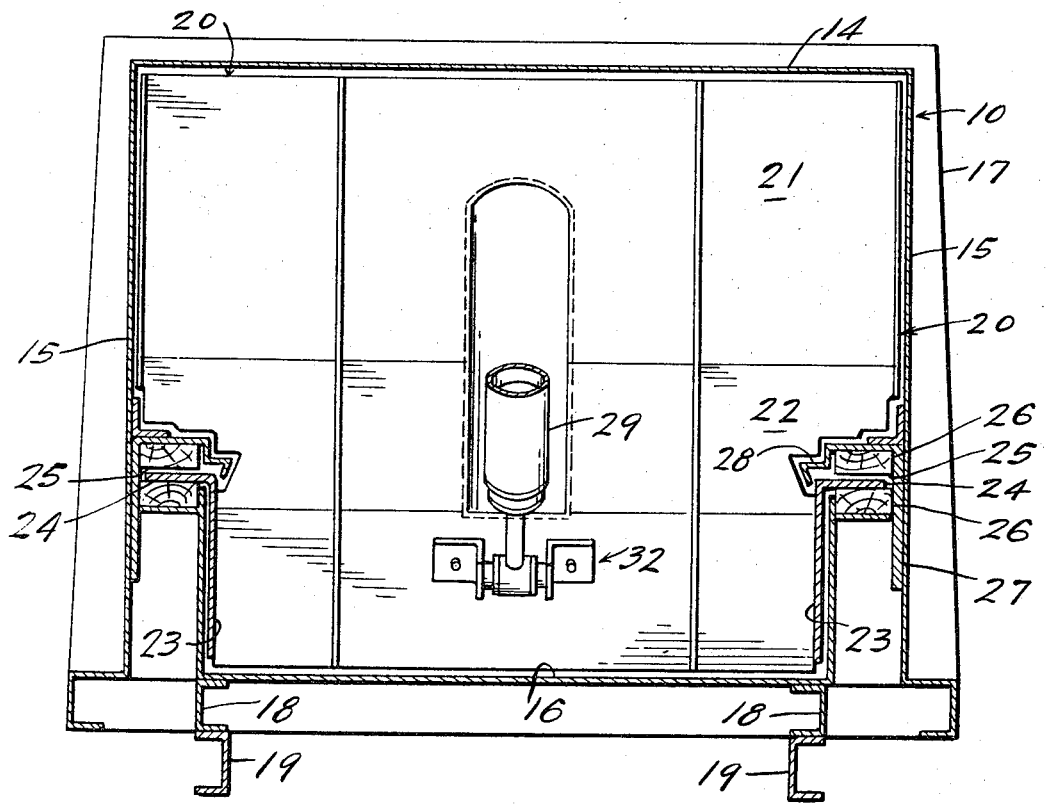
FIG-2-
INVENTORS:
GEORGE W. PALMER.
RICHARD C. GAST.
RAY E. BARTHOLOMEW.
BY Owen & Owen
ATT'YS.

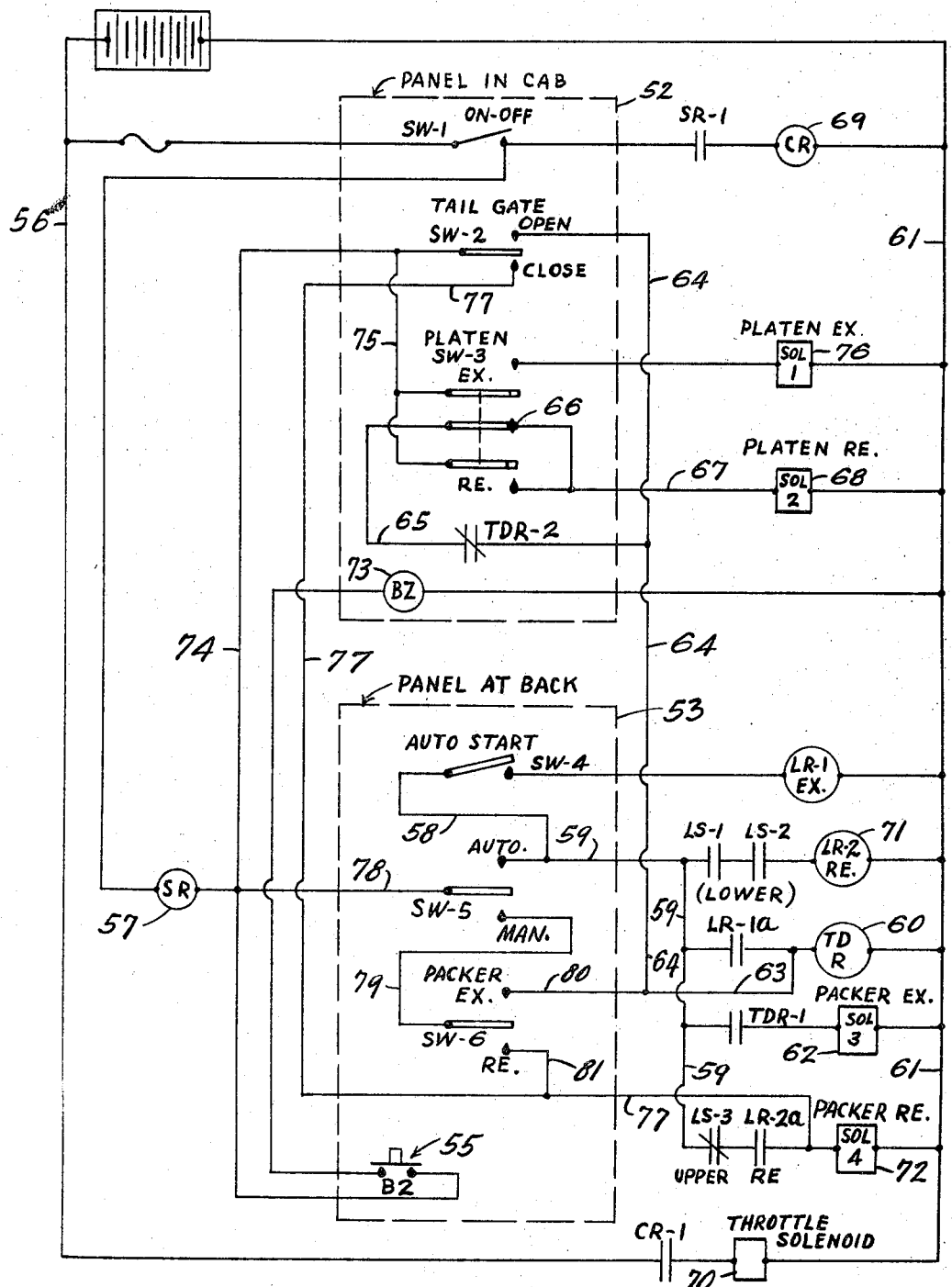

United States Patent Office 3,402,837
Patented Sept. 24, 1968

3,402,837
REFUSE COLLECTING VEHICLE
George W. Palmer, Richard C. Gast, and Ray E. Bartholomew, Galion, Ohio, assignors to Hercules Galion Products, Inc., Galion, Ohio, a corporation of Delaware
Filed Sept. 12, 1966, Ser. No. 578,588
4 Claims. (Cl. 214—83.3)

ABSTRACT OF THE DISCLOSURE

A refuse truck having a hollow body, an ejection platen positioned across the body and movable therethrough from end to end and a loading device at the open rear end of the body. The loading device comprises a hopper and a packer blade for transferring refuse from the hopper into the rear of the body. The packer blade has a normal position extending across the open rear of the body and is mounted for movement rearwardly from a normal position across the open rear end of the body to the rear of the hopper and then forwardly through the hopper back to normal position. The truck has mechanism for moving the platen in the body, mechanism for moving the packer blade through its path and control means, including a time delay device, for moving the platen incrementally forwardly in the body before the packer blade is moved rearwardly from its normal position.

---

This invention relates to refuse collecting vehicles of the type generally referred to as rear loaders which have receiving hoppers and packer blade mechanisms for moving the refuse from the hoppers into the bodies of the vehicles, both contained in and supported by tailgates. Such a tailgate usually is hingedly connected at the open rear end of the vehicle body so that the tailgate can be swung out of the way for the discharge of the collected material from the body of the truck.

The present invention particularly relates to a vehicle of this type having an ejection platen which extends transversely across the body and which is movable longitudinally through the body, to the front end thereof, to provide space into which refuse can be transferred from the receiving hopper and then rearwardly to eject refuse from the body after the tailgate has been swung out of the way.

It has been previously suggested that such an ejection platen may function as an abutment against which the refuse can be pre-compacted by the packer blade and that it may be made pressure responsive to the force exerted on the refuse by the packer blade, so that it will move forwardly in the body automatically in response to increased pressure on the refuse between it and the packer blade as the packer blade forces additional refuse into the body. Such an operation of the ejection platen has the advantage that its forward movement enlarges the space into which the packer blade can pack refuse. However, it also has a disadvantage which is principally apparent when the packer blade jams or binds during its packing or transferring movement. For example, if a bulky object which presents great resistance to the movement of the packer blade transferring it from the receiving hopper into the body causes the packer blade to jam, the pressure on the ejection platen very likely will not be sufficient to cause it to respond and move forwardly in the body. Even repeated cycling of the packer blade may not create sufficient pressure against the ejection platen so that the pressure responsive circuitry is actuated to move the ejection platen forwardly.

It is, therefore, the principal object of the instant invention to provide a refuse truck having an elongated, enclosed body with an open rear end, an ejection platen extending across the body and movable backwardly and forwardly through the body, a loading device at the open rear end of the body which loading device comprises a receiving hopper and a packer blade, both the ejection platen and the packer blade being powered for movement through their respective paths and which is provided with a combination of control circuitry whereby whenever the packer blade power mechanism is energized to move the packer blade forwardly through the receiving hopper in order to transfer refuse from the receiving hopper into the body, the ejection platen is preliminary moved forward an increment of distance thereby to increase the volume of the space into which the packer blade is transferring the refuse. Thus, when the packer blade is cycling to pack refuse, each new charge is given space into which to be transferred while yet the ejection platen remains in proper position to effect a pre-compaction of the refuse.

The invention provides for a distinct improvement in operation by causing forward movement of the ejection platen each time that the packer blade power mechanism is energized to move the packer blade forwardly and to thrust against a load of refuse for transferring that refuse into the body. For example, if the charge of refuse contains an object which is causing the packer blade to jam, i.e., which is so bulky or of such size or shape as to not readily be movable into the body behind the ejection panel, each time that the operator cycles the packer blade power mechanism in an attempt to transfer the charge into the body, the ejection panel is automatically moved forward an increment of distance to enlarge the space at the rear of the body behind the ejection panel into which the packer may transfer the object causing the difficulty.

In common with other refuse collecting vehicles of the general type being described, the vehicle embodying the instant invention also has mechanism by which the tailgate can be swung out of the way and by which the ejection panel can be powered rearwardly through the body for ejecting the accumulated load of refuse out of the open rear end of the body to a city dump or other location.

The above and more specific objects and advantages of a refuse collecting vehicle embodying the instant invention will be better understood from the specification which follows and from the drawings in which:

FIG. 1 is a view in elevation with parts broken away and parts shown in broken lines, generally illustrating a refuse collecting vehicle of the type herein described which may be provided with mechanism according to the invention;

FIG. 2 is a fragmentary, vertical section taken along the line 2—2 of FIG. 1 and shown on an enlarged scale;

FIG. 3 is a fragmentary vertical sectional view, taken longitudinally along the median line of the vehicle shown in FIG. 1 and illustrating the location of the packer blade in its "normal" or rest position, with the ejection panel shown at a point relatively near to the rear open end of the truck body;

FIG. 4 is a fragmentary, vertical sectional view similar to FIG. 3 but showing the packer blade at the position in its cycle wherein it is commencing to transfer a charge of refuse from the loading hopper into the body;

FIG. 5 is a view similar to FIGS. 3 and 4, but illustrating how the tailgate is swung out of the way and the ejection platen powered rearwardly to eject a load of refuse out of the then open end of the body; and FIG. 6 is a simplified, schematic wiring diagram, showing the combination of controls by which the above described operation is carried out according to the present invention.

A refuse collecting vehicle embodying the invention, has an elongated, enclosed body, generally indicated by the reference number 10 which may be mounted upon a conventional truck chassis 11 having a driver's cab 12 at the front. The vehicle has a loading device, generally indicated by the reference number 13, hingedly mounted at the upper side to the truck body 10 and functioning as a tailgate for the open rear end of the body 10. The loading device 13 is shown in its lower or closed position in FIG. 1, and its elevated or open position in FIG. 5. The body 10 preferably is fabricated from sheet metal forming an enclosure of rectangular, vertical cross section and comprising, generally, a top 14, side walls 15, and a bottom 16. The bottom 16 is flat and extends as an unbroken surface from front to back of the body 10. The top 14, side walls 15, and bottom 16 are braced and rigidified by external box-like channels 17 and body girders 18 which rest on or are supported by longitudinal members 19 of the chassis 11.

An ejection platen, generally indicated by the reference number 20, extends transversely across the body 10 from side to side and top to bottom, and is mounted in the body 10 for movement from one end to the other. The ejection platen 20 has an upper, vertical portion 21 and a lower, main portion 22, which is inclined rearwardly relative to the body 10. The ejection platen 20 is fabricated from heavy plate and is provided with return side and bottom members so as to form a rigid structure. Heavy angles 23 are secured as by welding or the like at the lower sides of the platen 20. The angles 23 have outwardly turned horizontal arms 24, each of which is engaged in one of a pair of horizontal tracks 25, extending along the sides 15 of the body 10. The tracks 25 are illustrated as being formed by a pair of vertically spaced, heavy, wooden beams 26, the beams 26 in turn being supported by elongated mounting brackets 27 on each side of the body 10 which include overhangs 28 to prevent the ingress of refuse and the like into the tracks 25.

A platen power mechanism for moving the ejection platen 20 back and forth in the body 10 is illustrated as consisting of a telescoping hydraulic cylinder set 29 which is secured at one end to a pivot structure 30 mounted in an upper, forward corner between the roof 14 and a front wall 13 of the body 10. The lower, rearward end of the cylinder set 29 is pivotally connected at the center bottom of the ejection platen 20 by a heavy clevis 32. The cylinder set 29 is illustrated as being a several part telescoping set and is double-acting so that by reversing hydraulic connections to the cylinder set 29, the ejection platen 20 can be moved forwardly or rearwardly in the body, as the case might be. In FIG. 1 the ejection platen 20 is shown in broken lines both at its forward position, indicated by the reference number 20a, and at its rearmost position, indicated by the reference number 20b.

The loading device 13 is shown in FIGS. 1, 3 and 4 in its down or closed position in which it functions as a tailgate to close the otherwise open rear end of the body 10, and is shown in its elevated or open position in FIG. 5 into which it is swung to permit the refuse to be ejected from the body 10 by the movement of the ejection platen 20 to the rearmost position shown in FIG. 5. The loading device has a pair of heavy side walls 33, connected to each other by a heavily braced roof 34, and by a hopper 35. The front edges of the side walls 33, roof 34 and hopper 35 mate with the rear edges of the roof 14, side walls 15 and bottom 16 of the truck body 10, the floor 16 being bent downwardly at its rear to form a lip 36 aligned with the upper front edge of the hopper 35. The loading device 13 is hinged in the manner of a tailgate to the upper rear portion of the body 10 by hinge pins 37 so that it can be swung from its lower position (FIGS. 3–4) to its open position (FIG. 5). Refuse may be emptied into the hopper bottom 35 through a rear opening in the loading device 13 which is defined by the rear, generally vertical edges of the side walls 33, the lower edge of the roof 34 and a heavy lip 38 which extends across between the side walls 33 at the rear of the hopper 35.

A heavy, structurally rigid, packer blade 39, is mounted for movement in the loading device 13 from a "normal" position (illustrated in FIG. 3) in which it closes off the open rear end of the body 10 retaining refuse in the body 10 between the ejection platen 20 and the packer blade 39. The packer blade 39 is movable back and forth through the loading device 13, being guided for that movement by a pair of closed tracks 40 which are formed in the side walls 33 and by a pair of generally vertically extending tracks 41 also formed in the side walls 33. The packer blade 39 has a pair of track rollers 42, one at each of its upper, outer corners, which are engaged in the vertically extending tracks 41, and a similar pair of track rollers 43 at its sides which are engaged in the closed tracks 40.

A packer blade power mechanism is illustrated as consisting of a pair of hydraulic cylinders 44 and rods 45, which are pivotally connected, respectively, to heavy ears 46 at their upper ends and to suitable clevises 47 carried at about the center and at the sides of the packer blade 39. The cylinders 44 are double-acting so that when the cylinder rods 45 are extended from the "normal" position shown in FIG. 3, the closed tracks 40 guide the packer blade 39 upwardly and rearwardly, thence downwardly, inserting the lower edge of the packer blade 39 behind a charge of refuse in the hopper 35, whereupon the hydraulic connections to the cylinders 44 are changed to retract the rods 45, drawing the packer blade 39 forwardly as guided by the track 40 to transfer a charge of refuse from the hopper 35 into the body 10 as the packer blade 39 moves forwardly from the position illustrated in FIG. 4.

In the illustrated embodiment of the invention, a track switch 48 is located at the lower, rearward corner of each of the closed tracks 40. Each of the track switches 48 is pivotally mounted with one end protruding into the respective track 40 so that as the packer blade 39 moves down at the rear of the loading device 13, being guided by the rear, generally vertical arm of the track 40, the respective one of the track rollers 43 trips the track switch 48 and passes therebeyond. The track switches 48 are so counterbalanced as to drop back into the position illustrated in FIG. 4, for example, to prevent the movement of the track rollers 43 backwardly up the generally vertical arms of the tracks 40. Similarly, track switches 49 are located adjacent the upper, forward corners of the closed tracks 40 so that as the cylinder rods 45 are retracted to pull the packer blade 39 forwardly, sweeping refuse from the hopper bottom 35 into the body 10, the track rollers 43 trip the track switches 49 which drop in below the track rollers 43 as illustrated in FIG. 3. Thus, when a subsequent cycle of movement of the packer blade 39 is initiated, and the piston rods 45 of the cylinders 44 are extended, the track rollers 43 engage the switches 49 deflecting the rollers 43 up the upwardly inclined arms of the tracks 40 to move the packer blade 39 backwardly and over the load of refuse in the hopper 35 rather than allowing it to be moved downwardly and rearwardly in the lower curving arm of the closed tracks 40.

The track switches 49 have handles 50 on the exteriors of the side walls 33 of the loading device 13 so that they may be manually moved out of track obstructing position and stop pins 51 may be inserted across the portions of the tracks 40 just below the switches 49. When the cylinders 44 are powered to extend the rods 45, the rollers 43 move backwardly down the tracks 40 into engagement with the pins 51. Because the packer blade 39 is thus locked against movement relative to the loading device 13 by the stop pins 51, the entire loading device 13 can be swung upwardly by the rods 45 into the position illustrated in FIG. 5.

A more complete explanation of the operation of the loading device 13 and the track switches 48 and 49 throughout a normal cycle of packing operations and in order to effect the swinging of the loading device 13 upwardly out of the way to the position illustrated in FIG. 5, is found in Herpich et al. Patent No. 3,249,243 of May 3, 1966. All of the structure so far described with respect to FIGS. 1–5 of the drawings, is substantially identical with the structure illustrated in the mentioned patent and it is the combination of control mechanisms therewith as described below which constitutes the improvement embodying the present invention.

Although the ejection platen power mechanism for moving the ejection platen 20 back and forth in the body 10 is illustrated in the drawings as consisting of the hydraulic, telescoping cylinder set 29, it will be appreciated other mechanisms such as an endless chain extending along the bottom of the body 10 and driven in opposite directions, for example by electric motors, could also be utilized for this purpose. Similarly, while but a single pair of hydraulic cylinders 44 and rods 45 are illustrated in the drawings as functioning both to move the packer blade 39 through its cycle, and to elevate the loading device 13, separate power mechanisms could be employed for these two purposes. A plurality of latches 54, FIGS. 3 and 4, are mounted on the under side of the hopper 35 and are normally engaged with the lip 36 of the body bottom 16, in order to retain the loading device 13 in its lower, closed position. The latches 54 are manually disengaged before the loading device 13 is swung upwardly to the position illustrated in FIG. 5.

Control mechanism

Referring now to FIG. 5 of the drawings, the combination of control mechanism will be described by which the previously described structure is caused to function according to the teachings of the instant invention.

In FIG. 5, there are two outlined boxes bearing the labels "Panel in Cab" and "Panel at Back," each of which includes the switches and controls which are thus located. For example, in a control box 52 on the instrument panel of the truck cab 12 and in a control box 53 mounted on the side of the loading device 13.

The panel control box 52 mounts a main "on-off" switch SW–1 (FIG. 5), a "tailgate" switch SW–2 having two positions, "open" and "close," and a platen switch SW–3 having two positions "extend" and "retract." The back outside control box 53 mounts an "auto-start" switch SW–4, and "auto-manual" selector switch SW–5, and a second packer switch SW–6. It also may mount a push button 55 for a warning buzzer.

The main "on-off" switch SW–1, located in the cab box 52, controls the entire circuit so that the driver can prevent actuation of any of the mechanism when the truck is in motion simply by opening this switch. When the switch SW–1 is closed, a main line 56 is connected thereby to one side of a coil 57 of a sensing relay SR. The coil 57 is responsive to a certain amperage but allows current of lesser amperage to flow therethrough so that its opposite side may be connected by switch SW–5 in either the automatic or manual positions for the further actuation of the mechanism.

When it is desired to automatically cycle the packer blade 39 through a complete excursion from the normal position illustrated in FIG. 3 upwardly and backwardly to the position illustrated in FIG. 4, and thence forwardly and upwardly to the position illustrated in FIG. 3 again, the switch SW–5 is moved to "automatic" position. When the operator desires to start the automatic cycle, he closes the "auto-start" switch SW–4 and current then flows from SW–5 through a shunt line 58 to SW–4 and then through the coil of a latching relay LR–1. The latching relay LR–1 closes its normally open contacts LR–1a so that a circuit is established from switch SW–5 through a lead 59, the now closed contacts LR–1a and a coil 60 of a time delay relay TDR, to the opposite main line 61. Normally open contacts TDR–1 of the time delay relay are connected in series between a coil 62 of a "packer extend" solenoid valve SOL–3 and the lead 59, the coil 60 being connected to the main line 61. Energization of the solenoid valve SOL–3 connects hydraulic pressure to the cylinder 44 so as to extend its rod 45 and move the packer blade 39 rearwardly in the loading device 13. However, the open contacts TDR–1 prevent the energization of the solenoid valve SOL–3 until the time delay relay TDR times out and closes these contacts. When the coil 60 of the time delay relay is first energized, a set of closed contacts TDR–2 provide a circuit from the "automatic" side of the switch SW–5 through the lead 59, the now closed contacts LR–1a, a branch lead 63, a lead 64, the contacts TDR–2, a lead 65, normally closed contacts 66 of the switch SW–3, and a lead 67 to the coil 68 of the solenoid valve SOL–2 and then to the main line 61.

Current flows through the circuit just described to the coil 68 of solenoid valve SOL–2 to shift the hydraulic valves for the cylinder set 29 to slowly retract the platen 20 toward the front of the body 10. As long as current flows through the coil 68 of the solenoid valve SOL–2, a sufficient load exists in the circuit through the coil 57 of the sensing relay SR to pull in this relay, closing its normally open contacts SR–1 (top right, FIG. 5), and establishing a circuit from the main on-off switch SW–1 through the coil 69 of a control relay to the side 61, to close its normally open contacts CR–1 (bottom, FIG. 6) and establish a circuit from the main line 56 through the coil 70 of a throttle solenoid. This speeds up the engine which drives the hydraulic pump supplying hydraulic fluid under pressure of the hydraulic circuitry of the device so as to give sufficient force to the cylinder set 29 to move the ejection platen 20 forwardly as described.

When the time delay relay times out, it changes its contacts TDR–1 from open to closed, and its contacts TDR–2 from closed to open. This immediately de-energizes the coil 68 of solenoid valve SOL–2, stopping the retracting movement of the ejection platen 20 and energizes the coil 62 of solenoid valve SOL–3 which is then in series with the contacts TDR–1 from the branch lead 59 to the main line 61. The time delay relay contacts TDR–1 remain in closed position while the solenoid valve SOL–3 directs hydraulic fluid to the packer blade cylinders 44 to extend the rods 45 and move the packer blade 39 from its normal (forward) position of FIG. 3 upwardly and backwardly as guided by the track 40 to its rearmost position.

It may be noted here, that the time delay relay TDR is so designed that the contacts TDR–1 remain closed and the contacts TDR–2 remain open until the next beginning of a cycle and commencement of a timing period.

When the packer blade 39 reaches its rearmost, lowermost position i.e., with its track rollers 43 slightly to the left of the position illustrated in FIG. 4, each of the track rollers 43 closes a respective one of a pair of limit switches LS–1 and LS–2 which are located at this point in the tracks 40 and which are electrically connected to each other in series between the lead 59 and a coil 71 of a latching relay LR–2, the opposite side of which is connected to the main line 61. The provision of a limit switch LS–1 or LS–2, in each of the two closed tracks 40, results in preventing the energization of the coil 71 of the latching relay LR–2 until both sides of the packer blade 39 and both of the track rollers 43 have reached the rearmost and lowermost position. This eliminates the possibility that one of the pair of packer blade power cylinders 44 could have its connections reversed to move the packer blade 39 forwardly in the loading device 13 before the other one of the cylinders 44 is similarly connected.

When the limit switches LS–1 and LS–2 are both closed current flows through the coil 71 of the latching relay LR–2 closing its contacts LR–2a and establishing a circuit from the branch line 59 through a normally closed limit switch LS–3 and the contacts LR–2a to a coil 72 of a solenoid valve SOL–4 and to the main line 61. Shifting the solenoid valve SOL–4 reverses the hydraulic connections to the two cylinders 44 causing them to retract their piston rods 45 and move the packer blade 39 forwardly with its lower edge sweeping through the hopper 35 to transfer refuse therein upwardly and forwardly into the body 10.

When the packer blade 39 reaches its normal position (FIG. 3) normally closed limit switch LS–3 is opened to break the circuit from the branch line 59 through the latching relay contacts LR–2a and the coil 72 to shift the solenoid valve SOL–4 thus to discontinue the feeding of power fluid to the retract side of the packer blade power mechanism, viz., the pair of hydraulic cylinders 44, and the packer blade comes to a stop in its normal, body closing position illustrated in FIG. 3.

There has so far been described an automatic packer control mechanism which moves the packer blade away from its normal position illustrated in FIG. 3, backwardly over the charge of refuse in the hopper bottom 35 and forwardly through the hopper to transfer that load of refuse into the body, completing the cycle at the normal position wherein the packer blade closes the otherwise open end of the body 10. There has also been described a control means comprising the time delay relay TDR and its interconnections between the automatic packer control mechanism and the platen control mechanism whereby when the operator starts an automatic cycle intending that the packer blade 39 shall be moved through its cycle, the time delay relay comes into play to energize the platen power mechanism for moving the platen 20 forwardly in the body 10 before the packer blade 39 leaves its normal position and starts to move backwardly to transfer refuse into the body 10.

Assuming now that no problems have been encountered in the loading of refuse into the vehicle, the operators who empty the refuse into the hopper continue to do so until a charge has been accumulated therein and then initiate the automatic cycle already described to transfer that charge into the body 10, repeating this series of operations until the ejection platen 20 has been moved incrementally forward to its foremost position indicated by the reference number 20a in FIG. 1 and the body 10 is completely loaded with refuse. The driver may then open the main control switch SW–1 and drive the vehicle to the dump or other location where refuse is to be discharged.

Upon arrival at a dumping location, one of the operators opens the latches 54 and inserts the stop pins 51 through the closed tracks 40 at the position indicated in FIG. 5 preparatory to opennig the body 10 by swinging the loading device 13 upwardly, as a "tailgate" to the position illustrated in FIG. 5.

When the operator has completed the two manual adjustments just described, he signals this fact to the driver by closing the push button 55 which establishes a circuit through the coil 57 of the sensing relay, the push button 55 and a buzzer 73 located in the cab and thence to the main line 61. This signals to the driver that the tailgate latches 54 have been opened and the stop pins 51 have been inserted in the two tracks 40. The driver then closes the main switch SW–1 and shifts the "tailgate" switch SW–2 to the "open" contacts. This establishes a circuit through the coil 57 of the sensing relay, a line 74, the "open" contacts of the switch SW–2 and the lines 64 and 63 to the coil 60 of the time delay relay.

Energization of the time delay relay results in application of power to the platen power mechanism to urge the platen 20 forwardly and, upon elapse of the timed period, to shift the solenoid valve SOL–3 to apply power to the packer blade power mechanism for extending the rods 45 of the hydraulic cylinders 44. Because the track switches 49 have been moved out of the way and the stop pins 51 inserted across the track 40, as explained above, extension of the rods 45 swings the loading device upwardly to the position shown in FIG. 5.

It should be noted here that the timed period of the time delay relay TDR may be selectively set at short times, say, 30, 45 or 60 seconds, because it is intended that the platen 20 shall move forwardly only a few inches during each automatic cycle. Therefore, although the time delay occurs when it is desired to lift the loading device to the position shown in FIG. 5 as explained above, the delay is short. It should also be noted that although pressure is applied to move the platen 20 forwardly, even through it is at the forward end of its movement, the structure is so designed that this power pressure has no effect.

After the loading device has been raised to its open position, the driver shifts the platen switch SW–3 to the "extend" position. This closes a circuit from the line 74 and a line 75 through the switch SW–3 to a coil 76 of a platen extend solenoid SOL–1 to move the platen 20 toward the rear to eject refuse from the body 10.

When all of the refuse has been ejected from the body 10, i.e., when the platen 20 has moved to its rearmost position as illustrated in FIG. 5, the driver shifts the platen switch SW–3 into its "retract" position opening the circuit to the coil 76 of the solenoid valve SOL–1 and closing a circuit from the line 75 through the "retract" contact of the switch SW–3 and the line 67 through the coil 68 of the solenoid retract valve SOL–2. Holding the platen switch SW–3 in the "retract" position for a very brief time moves the platen 20 forwardly enough in the body from its rearmost position to permit the initiation of loading cycles again.

Thereafter the driver moves the tailgate switch SW–2 to its "close" position establishing a circuit from the line 74 through the "close" contacts of the tailgate switch SW–2, and a line 77 which bypasses the switch LS–3 and the contacts LR–2a to energize the coil 72 of the packer retract solenoid valve SOL–4. This shifts the hydraulic connections to the cylinders 44 to cause them to retract their rods 45 and to lower the loading device 13, i.e., the "tailgate" from the open position illustrated in FIG. 5 back to the closed position illustrated in the other figures. If the driver is controlling this operation from the cab of the vehicle, he listens for the contact between the metal edges of the loading device 13 and the body 10 which vibrates through the body 10 to signal to him that the gate is closed. When the gate has been closed, the "tailgate" switch SW–2 may be moved back to its neutral position as illustrated in FIG. 6. The driver or the operator then relatches the latches 55 to retain the loading device 13 in its closed or lowered position.

The operator then removes the stop pins 51 from the track 40 and swings the track switches 49 back into track normal position thus setting the track 40 for subsequent loading operations. The hydraulic and electrical circuits are now re-established in condition for automatic cycling of the packer blade 39 to accumulate another load of refuse as described above.

Assuming now that during the sequence of an automatic loading operation a large object has become jammed in the opening to the back of the body 10, and it is desired to recycle the packer blade 39 in an effort to push this object into the body. The operator shifts the switch SW–5 from "automatic" position to "manual" position which sets up a circuit from a line 78 and the sensing relay 57 through the leaf of the switch SW–5 to its manual contact and thence through a shunt line 79 to the leaf of a packer switch SW–6 which may be moved into either of two positions, viz., "extend" or "retract."

If the jam in the operation of the packer blade 39 has resulted from endeavoring to force an object into the body 10, the hydraulic connections to the cylinders 44 are then in their "retract" setting, endeavoring to pull the rods 45 into the cylinders 44. To relieve the jam, the operator swings the packer switch SW–6 to the "extend" contact completing the circuit mentioned through the lines 78 and 79, a line 80, and the line 63 to the coil 60 of the time delay relay which initiates the control cycle to start a time delay during which the platen 20 is moved forwardly and after which the packer blade 39 is moved backwardly, all as explained above.

If the jam occurs during the time when the packer blade 39 is being moved rearwardly over the load of refuse in the hopper 35 or downwardly into the back of the hopper 35, the operator similarly swings the selector switch SW-5 to the manual position and then moves the packer switch SW-6 to close its retract contacts which completes a circuit from the lines 78 and 79 through the "retract" contacts of the switch SW-6 and a line 81 to the line 77 and then to the coil 72 of the packer retract solenoid SOL-4 retracting the rods 45 into the cylinders 44 to free the jam.

As necessary to overcome the jam or to free it, the operator may move the "packer" switch SW-6 between its two positions, "extend" and "retract," as the case may be, or may repeatedly endeavor to extend or retract the packer blade 39 as necessary. Each time that the operator endeavors to move the packer blade 39 backwardly to start a cycle in an attempt to force the object causing the jam into the body 10, it recycles through the time delay relay TDR to cause the platen 20 to be moved forwardly an increment thus to provide more space into which the object causing the jam can be forced.

It also should be observed that with the circuitry established as illustrated in FIG. 6, the actuation of the "tailgate," i.e., the loading device 13, from its closed to open position may also be accomplished from the rear of the vehicle by utilizing the switch SW-6, both sides of which are connected in parallel with respective sides of the "tailgate" switch SW-2.

Having described our invention, we claim:

1. In a refuse truck having an elongated, enclosed body with an open rear end, an ejection platen extending across and mounted in said body for movement forwardly and backwardly therein from one end to the other, and, at the open rear end of said body, a loading device comprising a receiving hopper and a packer blade, said packer blade having a normal position extending across at least the lower portion of the open rear end of said body and being mounted for movement in said loading device for transferring refuse from said hopper into said body, the improvement comprising, in combination, a platen power mechanism for moving said platen forwardly and backwardly in said body, a packer power mechanism operable for moving said packer blade from such normal position to the rear of said loading device and forwardly to such normal position for transferring a charge of refuse out of said loading device into said body behind said ejection platen, automatic packer control mechanism for energizing said packer power mechanism for moving said packer blade through a cycle away from and back to the normal position thereof, manual packer control mechanism parallel to said automatic packer control mechanism and operable for moving said packer blade in any part of such cycle, platen control mechanism for energizing said platen power mechanism for alternatively moving said platen forwardly and rearwardly, and control means, including a time delay device, connecting said packer control mechanism with said platen control mechanism and responsive to the actuation of said packer control mechanisms to move said packer blade rearwardly, for energizing said platen power mechanism for moving said platen incrementally forwardly in said body initially before said packer blade is moved rearwardly from the normal position of said packer blade.

2. A refuse truck according to claim 1 in which the loading device is hingedly connected to the body at the top of the open end of said body, the packer power mechanism extends between and is connected to the upper part of said body near the rear open end and to the packer blade, and which has means for locking the packer blade against movement in said loading device whereby when said packer blade is locked, actuation of said packer power mechanism swings said loading device upwardly providing for discharge of refuse from said body.

3. A refuse truck according to claim 2 in which the packer power mechanism consists of a pair of double acting hydraulic cylinders and pistons pivotally connected at their upper ends at the top of the open end of the body and at their lower ends to the packer blade, and in which the loading device has means for guiding said packer blade through a closed path transferring refuse into said body and means for holding said packer blade in a fixed position in said path relative to said loading device.

4. A refuse truck accrding to claim 1 in which said time delay device comprises means for (1) preventing actuation of the packer power mechanism for rearward movement of said packer blade when said packer control mechanisms are so actuated, (2) actuating said platen power mechanism for movement of said platen forwardly during the time delay period and, (3) actuating said packer power mechanism for initiating such rearward movement of said packer blade upon elapse of the time delay period.

References Cited
UNITED STATES PATENTS

| | | | |
|---|---|---|---|
| 3,049,256 | 8/1962 | Urban | 214—518 |
| 3,220,586 | 11/1965 | Gollnick | 214—83.3 XR |
| 3,229,832 | 1/1966 | Ferrari et al. | 214—83.3 |
| 3,249,243 | 5/1966 | Herpich et al. | 214—83.3 |
| 3,257,012 | 6/1966 | Berolzheimer | 214—83.3 XR |

ALBERT J. MAKAY, *Primary Examiner.*